US 11,247,722 B2

(12) United States Patent
Pasquet

(10) Patent No.: US 11,247,722 B2
(45) Date of Patent: Feb. 15, 2022

(54) MODIFICATION OF THE TRAJECTORY OF A VEHICLE WHEEL IN THE EVENT OF STEERING SYSTEM FAILURE

(71) Applicant: FOUNDATION BRAKES FRANCE, Drancy (FR)

(72) Inventor: Thierry Pasquet, Vincennes (FR)

(73) Assignee: FOUNDATION BRAKES FRANCE, Drancy (FR)

( * ) Notice: Subject to any disclaimer, the term of this patent is extended or adjusted under 35 U.S.C. 154(b) by 111 days.

(21) Appl. No.: 16/621,536

(22) PCT Filed: Jun. 12, 2018

(86) PCT No.: PCT/FR2018/051362
§ 371 (c)(1),
(2) Date: Dec. 11, 2019

(87) PCT Pub. No.: WO2018/229412
PCT Pub. Date: Dec. 20, 2018

(65) Prior Publication Data
US 2020/0102008 A1    Apr. 2, 2020

(30) Foreign Application Priority Data

Jun. 12, 2017    (FR) ..................................... 17 55236

(51) Int. Cl.
*G06F 17/00*        (2019.01)
*B62D 9/00*         (2006.01)
(Continued)

(52) U.S. Cl.
CPC ............ *B62D 9/005* (2013.01); *B60T 8/1755* (2013.01); *B60W 30/02* (2013.01); *B62D 5/003* (2013.01);
(Continued)

(58) Field of Classification Search
CPC ........ B62D 9/005; B62D 5/003; B62D 9/002; B60T 8/1755; B60T 2260/02; B60W 30/02; B60W 2510/20; B60W 2710/18
(Continued)

(56) References Cited

U.S. PATENT DOCUMENTS

| | | | | |
|---|---|---|---|---|
| 5,286,099 A | * | 2/1994 | Fujita | .................... B60T 13/745 |
| | | | | 303/125 |
| 10,351,162 B1 | * | 7/2019 | Katzourakis | ......... B62D 5/0475 |

(Continued)

FOREIGN PATENT DOCUMENTS

EP        3090907 A1    11/2016

OTHER PUBLICATIONS

International Search Report for International Patent Application No. PCT/FR2018/051362, dated May 10, 2018.
(Continued)

*Primary Examiner* — Ronnie M Mancho
(74) *Attorney, Agent, or Firm* — Pearne & Gordon LLP

(57) ABSTRACT

A motorised vehicle comprises a first wheel located laterally on a first side of the vehicle, and a second wheel located laterally on a second side of the vehicle opposite the first side. The vehicle comprises a steering system configured to modify the orientation of the wheels and to turn the vehicle. The vehicle comprises a trajectory modifier configured to vary the speed of rotation of the first wheel and to modify the trajectory of the vehicle in the event of failure of the steering system.

12 Claims, 2 Drawing Sheets

(51) Int. Cl.
  *B60T 8/1755* (2006.01)
  *B60W 30/02* (2012.01)
  *B62D 5/00* (2006.01)
(52) U.S. Cl.
  CPC .......... *B62D 9/002* (2013.01); *B60T 2260/02* (2013.01); *B60W 2510/20* (2013.01); *B60W 2710/18* (2013.01)
(58) Field of Classification Search
  USPC .......................................................... 701/70
  See application file for complete search history.

(56) References Cited

U.S. PATENT DOCUMENTS

| | | | | |
|---|---|---|---|---|
| 2003/0221894 | A1* | 12/2003 | Guldner | B60T 8/1755 180/402 |
| 2007/0176488 | A1* | 8/2007 | Miyajima | B62D 11/24 303/146 |
| 2009/0292421 | A1* | 11/2009 | Williams | B62D 5/0484 701/42 |
| 2011/0066319 | A1* | 3/2011 | Bechtler | B60T 8/885 701/29.2 |
| 2011/0231052 | A1* | 9/2011 | Ellis | B60T 8/246 701/31.4 |
| 2012/0053853 | A1* | 3/2012 | Tan | B60W 40/109 702/35 |
| 2012/0283907 | A1 | 11/2012 | Lee et al. | |
| 2013/0253793 | A1 | 9/2013 | Lee et al. | |
| 2016/0096434 | A1* | 4/2016 | Nakaoka | B60L 3/108 701/78 |
| 2016/0132055 | A1 | 5/2016 | Matsuno et al. | |
| 2017/0015204 | A1* | 1/2017 | Oguri | B60W 30/20 |
| 2018/0229705 | A1* | 8/2018 | Farres | B60T 13/741 |
| 2018/0237059 | A1* | 8/2018 | Lian | B62D 15/025 |
| 2018/0281599 | A1 | 10/2018 | Kentley-Klay | |
| 2018/0362009 | A1 | 12/2018 | Bourlon et al. | |
| 2019/0003535 | A1 | 1/2019 | Esnee et al. | |
| 2019/0202499 | A1* | 7/2019 | Straub | B60W 30/12 |

OTHER PUBLICATIONS

Written Opinion for International Patent Application No. PCT/FR2018/051362, dated May 10, 2018.
Preliminary French Search Report for French Patent Application No. 1755236, dated Feb. 28, 2018.
U.S. Appl. No. 16/621,504, entitled "Brake Calliper for a Vehicle Comprising a Braking Control Unit", filed Dec. 11, 2019 as a national stage of PCT/FR2018/051361.

* cited by examiner

MODIFICATION OF THE TRAJECTORY OF A VEHICLE WHEEL IN THE EVENT OF STEERING SYSTEM FAILURE

TECHNICAL FIELD

The invention relates to braking systems for a vehicle and the detection of the rotation speed of a vehicle wheel. It relates in particular to an automobile.

STATE OF PRIOR ART

Known automobiles are equipped with a braking system and a steering system which comprises a flywheel and a steering column which is mechanically connected to the vehicle wheels.

The braking system comprises a wheel antilock system and brakes. The antilock system comprises a rotation speed detector for at least one of the vehicle wheels.

There is a need for steering the vehicle and rotate it in the event that the steering system is failing.

DISCLOSURE OF THE INVENTION

In this regard, one object of the invention is a motor vehicle. The vehicle comprises a first wheel located sideways on a first side of the vehicle, and a second wheel located sideways on a second side of the vehicle opposite to the first side. The vehicle comprises a steering system configured to modify the wheel orientation and to rotate the vehicle.

The vehicle comprises a trajectory modifier configured to vary the rotation speed of the first wheel and modify the trajectory of the vehicle in the event that the steering system is failing.

The trajectory modifier is configured such that the brake increases a braking force of the first wheel to rotate the vehicle to the side of the first wheel. The trajectory modifier is configured such that the brake decreases a braking force of the first wheel to rotate the vehicle to the side of the second wheel.

The brake is an electromechanical brake comprising a control unit configured to control the braking of the first wheel.

Thanks to the trajectory modifier and in particular to the local control unit, it is possible to steer the vehicle in the event that the steering system is failing, while limiting the complexity of the vehicle, its mass and overall size. The trajectory modifier limits accident risks in the event that the steering system is failing.

The invention can optionally include one or more of the following characteristics combined to each other or not.

According to one feature, the trajectory modifier is configured to vary the rotation speed of the first wheel as a function of a signal representative of a rotation speed of the first wheel which is transmitted by a detector of the rotation speed of the first wheel.

According to one feature, the vehicle comprises an antilock system of the first wheel which comprises the detector of the rotation speed.

According to one feature, the trajectory modifier comprises a rotation speed comparator configured to compare the rotation speed of the first wheel with a rotation speed of the second wheel.

According to one feature, the trajectory modifier is configured to modify the rotation speed of the wheel if the absolute value of the deviation between the rotation speed of the first wheel and the rotation speed of the second wheel is higher than a threshold value.

According to one feature, the trajectory modifier is configured to modify the trajectory of the wheel as a function of an ideal trajectory of the vehicle which is carried out from:
a signal transmitted by a positioning detection system of the vehicle, and/or
a signal transmitted by an orientation detector for a flywheel of a steering system and/or a steering column of the steering system.

According to one feature, the trajectory modifier of the wheel comprises a disc brake configured to brake the first wheel.

According to one feature, the control unit of the brake of the first wheel is configured to directly communicate with a brake of the second wheel through a wired connection.

According to one feature, the brake comprises a braking hydraulic device to ensure the service braking of the first wheel, the braking hydraulic device being connected to a hydraulic circuit of the vehicle.

The invention relates to a method for modifying the trajectory of a vehicle as defined above.

The method comprises modifying the rotation speed of the first wheel to modify the trajectory of the vehicle, by the trajectory modifier, in the event that the steering system of the vehicle is failing.

BRIEF DESCRIPTION OF THE DRAWINGS

The present invention will be better understood upon reading the description of exemplary embodiments, in reference to the appended drawings in which.

DETAILED DISCLOSURE OF PARTICULAR EMBODIMENTS

Figure 1:
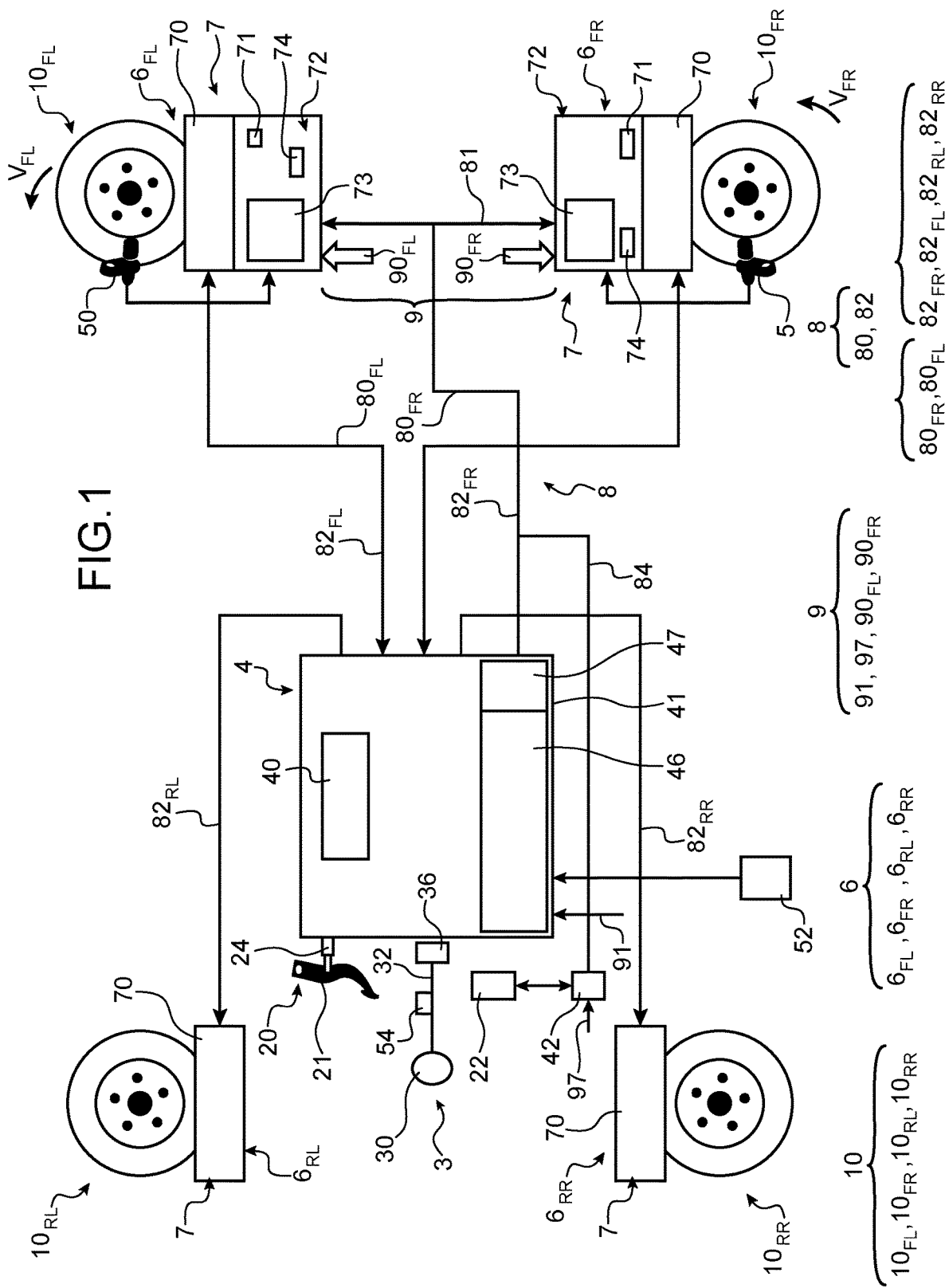
FIG. 1 is a partial schematic representation of a vehicle, according to a first embodiment of the invention.

Identical, similar or equivalent parts of the different figures bear the same reference numerals so as to facilitate switching from one figure to the other.

FIG. 1 represents a motor vehicle 1. In the embodiment represented, this is an automobile vehicle. The vehicle 1 comprises a left front wheel $10_{FG}$, a right front wheel $10_{FR}$, a left rear wheel $10_{RG}$ and a right rear wheel $10_{RR}$. It also includes a braking system 2, a steering system 3 and a control system 5 for the vehicle.

The steering system 3 comprises a flywheel 30, a steering column 32 and a steering gear-box 36. The steering system 3 is configured to modify the orientation of the vehicle wheels 10 and to rotate the vehicle 1.

The steering gear-box 36 comprises for example a pinion, a rack, connecting rods and stub axles. It is used to transform a rotation movement of the flywheel 30 and of the steering column 32 into a translational movement to rotate the wheels 10.

The control system 5 comprises for example rotation speed detectors 50 for each of the vehicle wheels 10, an overall vehicle speed detector, a vehicle yaw rate detector, a vehicle positioning detection system 52, and an orientation detector 54 for the flywheel and/or the steering column 32.

The control system 5 includes hardware and/or software means for detecting a failure of all or part of the steering system 3.

Each rotation speed detector 50 detects the rotation speed of the corresponding wheel 10. The vehicle positioning detection system 52 is for example a system known as "GPS". The orientation detector 54 detects the turning intensity that a user U wishes to apply to the vehicle 1.

The braking system 2 is for braking the vehicle wheels 10. It comprises disc brakes 6 to brake the wheels 10, an actuation system 20, a braking control system 4, a braking control network 8 and a power supply network 9.

The braking actuation system 20 comprises braking actuators 21, 22 and at least one actuation detector 24.

The actuators comprise a brake pedal 21 for service braking, and a control knob 22 for parking braking and emergency braking. The brake pedal 21 is for being depressed by a foot of a user U to brake the vehicle 1. The control knob 22 is a parking braking knob. The actuation detector 24 is connected to the control system 4 and it is used to detect the depression of the pedal 21 and/or of the control knob 22.

The braking control system 4 comprises a braking amplifier 40, an electronic stability control 44, an auxiliary control unit 42, a wheel antilock system and a box 41.

The braking amplifier 40 is configured to increase the braking force which is transmitted by the brake pedal 21 to the control network 8, when the detector 24 detects the depression of the brake pedal 21.

The electronic stability control 44 comprises a hydraulic actuator 47 and a central control unit 46. It is configured to command each of the brakes 6 to brake the corresponding wheel 10 via the control network 8.

The hydraulic actuator 47 comprises a hydraulic accumulator and a pressurising pump for the hydraulic circuit 82 which is common to the braking amplifier 40 and to the electronic stability control 44.

The central control unit 46 is configured to control the hydraulic actuator 47. Generally, it controls the hydraulic and/or electromechanical braking of each of the left front $6_{FL}$, right front $6_{FR}$, left rear $6_{RL}$, and right rear $6_{RR}$ brakes independently of the other via the control network 8.

The electronic stability control 44 and the braking amplifier 40 are housed within a same box 41, which enables redundancies in the braking system 2 to be limited, the mass and overall size of the braking system 2 to be limited.

The auxiliary control unit 42 controls parking the braking of the vehicle 1, when the control knob 32 is depressed. It possibly controls the emergency braking of the vehicle, when the control knob 32 is depressed.

The wheel antilock system is also known as "ABS". It comprises a control unit, for example the central control unit 46. This control unit is configured to optimise braking of each of the wheels 10, by preventing in particular slip thereof, as a function of the detected rotation speeds of the wheels.

The brakes 6 are vehicle disc brakes. The vehicle 1 comprises a left front brake $6_{FL}$ to brake the left front wheel $10_{FL}$, a right front brake $6_{FR}$ to brake the right front wheel $10_{FR}$, a left rear brake $6_{RL}$ to brake the left rear wheel $10_{FL}$, a right rear brake $6_{RR}$ to brake the right rear wheel $10_{RR}$.

Each of the disc brakes 6 includes a floating type calliper 7, a piston 71 housed in a body of the calliper 7, a disc, and brake shoes for clamping the disc and movable by the piston 71.

Each calliper 7 of the front brakes $6_{FL}$, $6_{FR}$ comprises a hydraulic braking device 70 and an electromechanical braking device 72. The calliper 7 also includes a hydraulic connection means, a supply connection means and a connection and data exchange means.

The hydraulic braking device 70 is of a known structure. It enables the hydraulic braking of the corresponding wheel 6 to be ensured. It ensures in particular the service braking of the wheel 6. The hydraulic connection means is used to connect the hydraulic braking device 70 to the hydraulic circuit 82 which is part of the control network 8.

The electromechanical braking device 72 comprises an electromechanical actuator 74 and a braking local control unit 73. The electromechanical braking device 72 is connected to a CAN type network 80 of the control network 8 by a connection and data exchange means. It is electrically supplied, at least partially independently of the control system 4, by the supply network 9.

The electromechanical braking device 72 is configured to ensure the electromechanical braking of the corresponding wheel 10. It ensures in particular the parking braking and emergency braking for the wheel.

The electromechanical actuator 74 comprises an electric motor and a transmission device which causes the piston 71 to be moved when driven by the electric motor.

The local control unit 73 comprises a CAN interface through which it is connected by the control network 8 to the central control unit 46, to the auxiliary control unit 42 and to the control unit 73 of the other brakes 6. This CAN interface is part of the connection means.

Each local control unit 73 is configured to control the electric motor of the electromechanical actuator 74 of the corresponding brake. Thereby, it locally controls the braking of the wheel 6.

When normally operating, each local control unit 73 is for example configured to brake the wheel upon command from the central control unit 46, the auxiliary control unit 42 and/or the amplifier 40.

In the event that the steering system 3 is failing, each of the control units 73 is configured to modify the trajectory of the vehicle 1 by braking, at least partially independently of the control system 4 and the steering system 3.

In the event that the steering system 3 is failing, each local control unit 73 is for example configured to modify the vehicle trajectory by braking, independently of the central control unit 46, the auxiliary control unit 42 and/or the amplifier 40.

The control unit 73 of each front brake $6_{FR}$, $6_{FL}$ is configured to vary the rotation speed $V_{FL}$, $V_{FR}$ of the corresponding wheel $10_{FR}$, $10_{FL}$ by braking, to modify the trajectory of the vehicle 1.

The control unit 73 of each front brake $6_{FR}$, $6_{FL}$ is configured to vary the rotation speed $V_{FL}$, $V_{FR}$ of the corresponding wheel, as a function of its rotation speed $V_{FL}$, $V_{FR}$ which is detected by its rotation speed detector 50.

It is configured to vary the rotation speed $V_{FL}$, $V_{FR}$ of the corresponding wheel $10_{FR}$, $10_{FL}$ also as a function of the rotation speed $V_{FL}$, $V_{FR}$ of the front wheel on the opposite side $10_{FR}$, $10_{FL}$.

It varies the rotation speed $V_{FL}$, $V_{FR}$ of the corresponding wheel $10_{FR}$, $10_{FL}$, as a function of an automatic trajectory of the vehicle 1 which is carried out from the information transmitted by the control system 5.

It also varies the rotation speed $V_{FL}$, $V_{FR}$ of the corresponding wheel $10_{FR}$, $10_{FL}$, also as a function of a turning demand from the user U.

The control unit 73 of each brake 6 is configured to control the temporary reduction in the braking force exerted on the corresponding wheel 10 when this wheel 10 begins to slip. Thereby, it forms a local antilock system for the wheel 10. This local antilock system can act complementarily to the wheel antilock system described above.

Each of the front brakes $6_{FL}$, $6_{FR}$ thus plays the role of a trajectory modifier for the vehicle 1, in the event that the steering system 3 is failing.

The operation of each front brake $6_{FR}$, $6_{FL}$ and of its control unit 73 is explained below, in reference to the left front brake $6_{FL}$ for the sake of clarity. The right front brake $6_{FR}$ has a structure and an operation analogous to that of the left front brake $6_{FL}$.

In the event that the steering system 3 is failing, the control unit 73 of the left front brake $6_{FL}$ is configured to command the actuator 74 of this brake to vary the braking force exerted onto the left front wheel $10_{FL}$ to modify the trajectory of the vehicle 1.

The control unit 73 of the left front brake $6_{FL}$ is configured to command the actuator 74 to increase the braking force exerted on the left front wheel $10_{FL}$ relative to the right front wheel $10_{FR}$, to rotate the vehicle 1 to the left.

The control unit 73 of the left front brake $6_{FL}$ is configured to command the actuator 74 to reduce the braking force exerted on the left front wheel $10_{FL}$ relative to the right front wheel $10_{FR}$, to rotate the vehicle 1 to the right.

The control unit 73 of the left front brake $6_{FL}$ is configured to modify the rotation speed $V_{FL}$ of the left front wheel $10_{FL}$, as a function of:
the automatic trajectory of the vehicle 1 which is carried out from the information transmitted by the control system 5, in the event that the steering system 3 is failing, and
the turning demand from the user U,
the yaw rate of the vehicle, the overall speed of the vehicle,
the rotation speed of the left front wheel $V_{FL}$, and
the speed deviation between the rotation speed of the left front wheel $V_{FL}$ and the rotation speed of the right front wheel $V_{FR}$.

The control unit 73 of the left front brake $6_{FL}$ is in particular configured to compare the rotation speed $V_{FL}$ of the left front wheel $10_{FL}$ with the rotation speed $V_{FR}$ of the right front wheel $10_{FR}$. The control unit 73 thus plays the role of a rotation speed comparator for the front wheels $10_{FL}$, $10_{FR}$.

The left front brake $6_{FL}$ is configured to vary the rotation speed $V_{FL}$ of the left front wheel $10_{FL}$ in case of too high a rotation speed deviation between both front wheels $10_{FL}$, $10_{FR}$.

In other words, the left front brake $6_{FL}$ is configured to vary the rotation speed $V_{FL}$ of the left front wheel $10_{FL}$ if the absolute value of the deviation "d" between the rotation speed $V_{FL}$ of the left front wheel $10_{FL}$ and the rotation speed $V_{FR}$ of the right front wheel $10_{FR}$ is higher than a threshold value $S_0$.

The left front brake $6_{FL}$ is configured to further brake the left front wheel $10_{FL}$ if its speed is too higher than that of the right front wheel $10_{FR}$. The left front brake $6_{FL}$ is configured to less brake the left front wheel $10_{FL}$ if its speed is too lower than that of the right front wheel $10_{FR}$.

The rear brakes $6_{RL}$ and $6_{RR}$ are of a structure identical to those of the front brakes, except that they do not comprise a braking electromechanical device 72.

The control network 8 comprises a data transmission network 80 and a hydraulic circuit 82.

The data transmission network 80 is a CAN type network ("Control Area Network"). This CAN type network 80 fulfils in particular the conditions of the ISO 11898 standard. This is a wired network.

The CAN type network 80 comprises braking control lines $80_{FL}$, $80_{FR}$, 81, 84 which connect the vehicle control units to each other, including the central control unit 46, the auxiliary control unit 42 and the control units 73 of the front brakes 6.

The CAN type network 80 comprises a braking control line for the left front wheel $80_{FL}$ and a braking control line for the right front wheel $80_{FR}$.

The braking control line for the left front wheel $80_{FL}$ connects the amplifier 40 and the electronic stability control 44 to the control unit 73 of the left front brake $6_{FL}$. The braking control line for the right front wheel $80_{FR}$ connects the amplifier 40 and the electronic stability control 44 to the control unit 73 of the right front brake $6_{FR}$.

The parking braking control line 84 connects the brakes 6 to the auxiliary control unit 42.

The data exchange line 81 between both brakes $6_{FR}$, $6_{FL}$ directly connects the control units 73 of the left $6_{FL}$ and right $6_{FR}$ front brakes to each other through their CAN interfaces.

The hydraulic circuit 82 is a pressurising circuit for the brakes 6. It comprises a left front braking hydraulic line $82_{FL}$, a right front braking hydraulic line $82_{FR}$, a left rear braking hydraulic line $82_{RL}$, a right rear braking hydraulic line $82_{RR}$.

The left front braking hydraulic line $82_{FL}$ fluidly connects the hydraulic actuator 47 to the braking hydraulic device 70 of the left front brake $6_{FL}$. The right front braking hydraulic line $82_{FR}$ fluidly connects the hydraulic actuator 47 to the braking hydraulic device 70 of the right front brake $6_{FR}$.

The left rear braking hydraulic line $82_{RL}$ fluidly connects the hydraulic actuator 47 to the braking hydraulic device 70 of the left rear brake $6_{RL}$. The right rear braking hydraulic line $82_{RR}$ fluidly connects the hydraulic actuator 47 to the braking hydraulic device 70 of the right rear brake $6_{RR}$.

The supply network 9 comprises a power supply line 91 for electrically supplying the control system 4 in the box 41, a power supply line 97 for electrically supplying the auxiliary control unit 42, and a power supply line 90 for supplying each of the front brakes $6_{FL}$, $6_{FR}$.

More precisely, the supply network 9 comprises a power supply line $90_{FL}$ for the left front brake $6_{FL}$, and a power supply line $90_{FR}$ for the right front brake $6_{FR}$.

The supply network 9 is configured to provide energy to each of the electromechanical braking devices 72 in need thereof to operate independently of each other, including in the event that the steering system 3 is failing.

Figure 2:
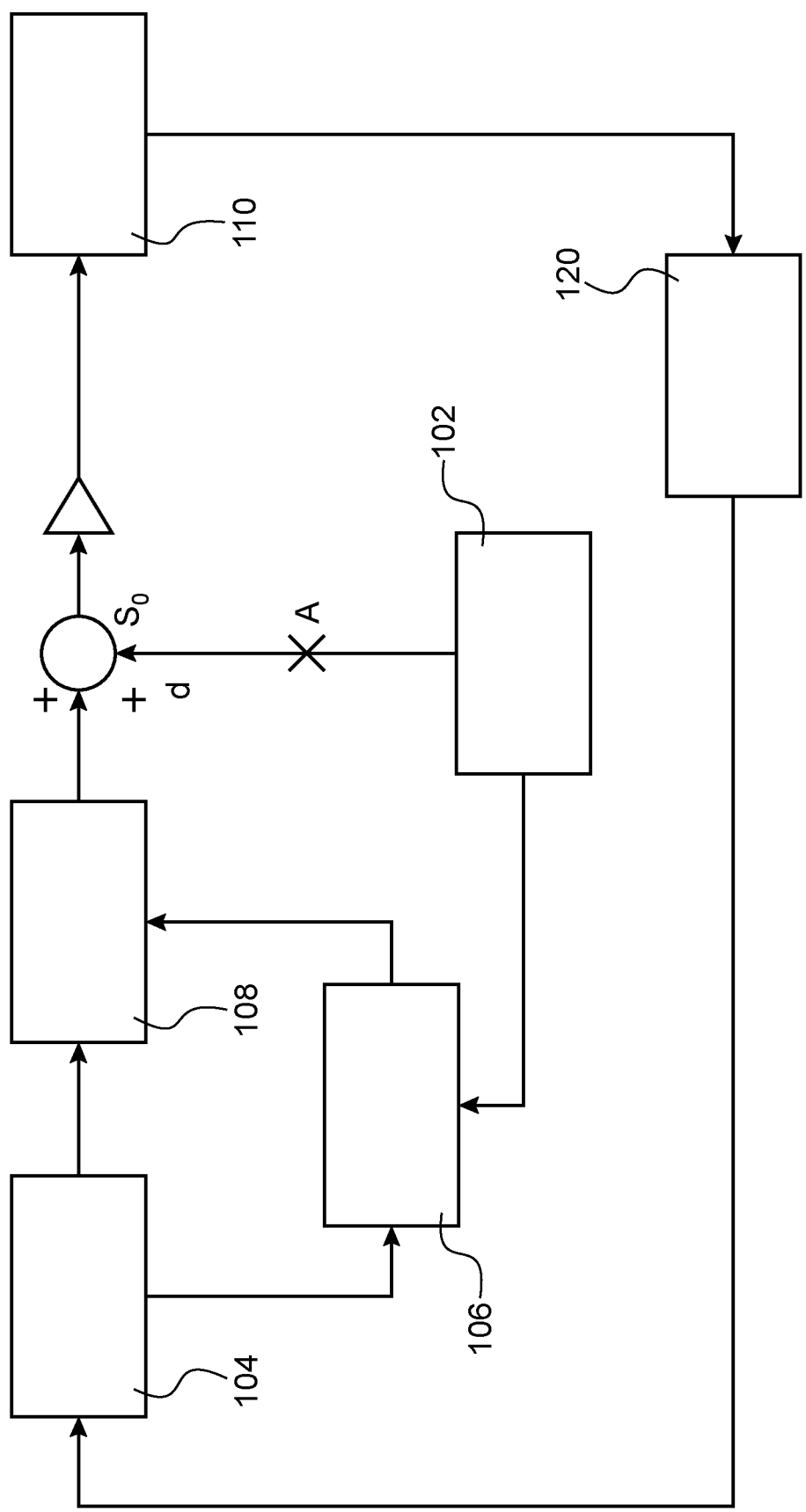
FIG. 2 is a schematic representation illustrating the implementation of a method for modifying the trajectory of the vehicle according to the first embodiment.

The method for modifying the trajectory of the vehicle 1 by braking, in the event that the steering system 3 is failing is described hereinafter in reference to FIG. 2.

This failure of the steering system 3 is for example caused by a breaking in the steering column 32. It is represented by the cross A in FIG. 2.

The control system 5 detects the possible turning intensity that a user U wishes to apply to the front wheels $10_{FR}$, $10_{FL}$, in spite of the failure of the steering system 3, in step 102. The trajectory that the user U wishes to impose to the vehicle 1 is thereafter called the user trajectory.

Moreover, the control system 5 and the control system 4 carry out an automatic trajectory for the vehicle 1, in step 104. This automatic trajectory for the vehicle is carried out from: the vehicle overall speed, its yaw rate, the information transmitted by the positioning detection system 52, and the information transmitted by the orientation detector 54.

The control system 5 and the control system 4 then carry out an ideal trajectory for the vehicle 1, from the user trajectory and the automatic trajectory, in step 106.

The control system 4 and/or each of the local control units 73 then carry out an automatic prediction of braking variation in each of the front wheels $10_{FR}$, $10_{FL}$ such that the vehicle 1 follows its ideal trajectory and to rotate it if need be, in step 108.

The braking automatic predictions give rise to a specific braking demand for each front wheel $10_{FL}$, $10_{FR}$, in step 110. The control unit 73 of the brake associated with the corresponding wheel $10_{FL}$, $10_{FR}$ then commands the corresponding actuator 74 to brake the wheel $10_{FL}$, $10_{FR}$ or not, in step 120.

The automatic trajectory of the vehicle is again determined in step 104 by the control system 5 and the control system 4, by taking the braking performed for each of the front wheels $10_{FL}$, $10_{FR}$ into account.

The process described above is then reiterated as long as the steering system 3 is failing and until the vehicle 1 is stopped.

The front brakes $6_{FL}$ and $6_{FR}$ enable the vehicle to be steered in the event that the steering system 3 is failing, which limits accident risks. The vehicle 1 according to the invention can be steered in the event that the steering system 3 is failing, while limiting its complexity, mass and overall size.

Of course, various modifications could be provided by those skilled in the art to the invention just described without departing from the scope of the invention.

Generally, the motor vehicle 1 comprises at least three wheels including a right wheel and a left wheel. The motor vehicle 1 can be of a different nature. Alternatively, the vehicle 1 is a three-wheel saddle type vehicle, a van, a lorry etc.

The left $6_{RL}$ and right $6_{RR}$ rear brakes can be electromechanical brakes in addition to or instead of being hydraulic brakes.

In addition or alternatively, the rear brakes $6_{RL}$ and $6_{RR}$ are electromechanical and each comprise a control unit 73, to implement the trajectory modification method described above.

Generally, it is highly preferable that the brakes 6 of the drive wheels are each equipped with a local control unit 73 as described above.

When the front $6_{FL}$, $6_{FR}$ and rear $6_{RL}$, $6_{RR}$ brakes are purely electromechanical, the hydraulic circuit 82 can be omitted and be replaced by hardware and/or software means for an electric brake control according to the invention, which limits the complexity of the braking system 2, mass and overall size of the vehicle 1.

NOMENCLATURE IN REFERENCE TO THE FIGURES

1: vehicle
2: braking system
3: actuation system
4: command system
5: control system
6: brakes
$6_{FL}$: left front brake
$6_{FR}$: right front brake
$6_{RL}$: left rear brake
$6_{RR}$: right rear brake
8: braking control network
9: power supply network
10: wheels
$10_{FL}$: left front wheel
$10_{FR}$: right front wheel
$10_{RL}$: left rear wheel
$10_{RR}$: right rear wheel
21: brake pedal
22: control knob
24: actuation detector
30: flywheel
32: steering column
36: steering gear-box
40: amplifier
41: box
42: auxiliary control unit
44: electronic stability control
46: central control unit
47: hydraulic actuator
50: wheel rotation speed detector
52: positioning detection system for the vehicle
54: flywheel and/or steering column orientation detector
70: braking hydraulic device
71: piston
72: braking electromechanical device
73: control unit
74: electromechanical actuator
80: CAN type network
$80_{FL}$: braking control line for the left front wheel
$80_{FR}$: braking control line for the right front wheel
$80_{RL}$: braking control line for the left rear wheel
$80_{RR}$: braking control line for the right rear wheel
81: The data exchange line between both front brakes
82: hydraulic circuit
$82_{FL}$: left front braking hydraulic line
$82_{FR}$: right front braking hydraulic line
$82_{RL}$: left rear braking hydraulic line
$82_{RR}$: right rear braking hydraulic line
$90_{FL}$: power supply line for the left front brake
$90_{FR}$: power supply line for the right front brake
$90_{FL}$: power supply line for the left rear brake
$90_{RR}$: power supply line for the right rear brake

What is claimed is:

1. A motor vehicle comprising:
a first wheel located sideways on a first side of the vehicle,
a second wheel located sideways on a second side of the vehicle opposite to the first side, and
a steering system configured to modify an orientation of the first and second wheels and to rotate the vehicle,
wherein the vehicle comprises a trajectory modifier configured to vary a rotation speed of the first wheel and to modify a trajectory of the vehicle in the event that the steering system is failing, and
wherein the trajectory modifier of the first wheel comprises an electromechanical brake which comprises a local control unit configured to control a braking of the first wheel, and
wherein the electromechanical brake comprises an electromechanical actuator and the local control unit, the local control unit configured to command the electromechanical actuator to brake the first wheel in the event that the steering system of the vehicle is failing so that the trajectory of the vehicle is closer to an ideal trajectory of the vehicle which is carried out by the trajectory modifier,
wherein the trajectory modifier is configured such that the electromechanical brake increases a braking force of the first wheel to rotate the vehicle to a first side of the first wheel, and/or
wherein the trajectory modifier is configured such that the electromechanical brake decreases the braking force of the first wheel to rotate the vehicle to a second side of the second wheel.

2. The vehicle according to claim 1, wherein the trajectory modifier is configured to vary the rotation speed of the first wheel as a function of a signal representative of a rotation speed of the first wheel which is transmitted by a detector of the rotation speed of the first wheel.

3. The vehicle according to claim 2, comprising a wheel antilock system which comprises the detector of the rotation speed of the first wheel.

4. The vehicle according to claim 1, wherein the trajectory modifier comprises a rotation speed comparator configured to compare the rotation speed of the first wheel with a rotation speed of the second wheel.

5. The vehicle according to claim 4, wherein the trajectory modifier is configured to modify the rotation speed of the first wheel if an absolute value of a deviation between the rotation speed of the first wheel and the rotation speed of the second wheel is higher than a threshold value.

6. The vehicle according to claim 1, wherein the trajectory modifier is configured to modify the trajectory of the first wheel as a function of the ideal trajectory of the vehicle which is carried out from:
- a signal transmitted by a positioning detection system of the vehicle, and/or
- a signal transmitted by an orientation detector for a flywheel of a steering system and/or a steering column of the steering system.

7. The vehicle according to claim 1, wherein the electromechanical brake configured to brake the first wheel is a disc brake.

8. The vehicle according to claim 1, wherein the local control unit is configured to directly communicate with a brake of the second wheel through a wired connection.

9. The vehicle according to claim 1, wherein the electromechanical brake comprises a braking hydraulic device to ensure a service braking of the first wheel, wherein the braking hydraulic device is connected to a hydraulic circuit of the vehicle.

10. A method for modifying the trajectory of a vehicle comprising the steps of:

modifying, by a steering system of a vehicle, an orientation of a first wheel and a second wheel of the vehicle and rotating the vehicle;

varying, by a trajectory modifier of the vehicle, a rotation speed of a first wheel to modify a trajectory of the vehicle, in the event that the steering system of the vehicle is failing, the trajectory modifier comprising an electromechanical brake which comprises an electromechanical actuator and a local control unit;

commanding, by the local control unit, the electromechanical actuator to brake the first wheel in the event that the steering system of the vehicle is failing so that the trajectory of the vehicle is closer to an ideal trajectory of the vehicle which is carried out by the trajectory modifier;

increasing, by the electromechanical brake via the trajectory modifier, a braking force of the first wheel to rotate the vehicle to a first side of the first wheel; and decreasing, by the electromechanical brake via the trajectory modifier, the braking force of the first wheel to rotate the vehicle to a second side of the second wheel.

11. The vehicle according to claim 1, wherein
the electromechanical brake comprises a caliper, a piston, a supply connector, and a connection and data exchanger,
the electromechanical actuator comprises an electric motor and a transmission device which causes the piston to be moved when driven by the electric motor, and
the local control unit is configured to command the electric motor to command braking of the first wheel.

12. The vehicle according to claim 1, wherein
the first wheel and the second wheel each comprise a drive wheel of the vehicle and a brake of the drive wheel of the vehicle comprises the electromechanical brake which includes the local control unit, and
the trajectory modifier includes each electromechanical brake of each drive wheel of the vehicle.

\* \* \* \* \*